A.H.Smith, M.D. Pistons.
110874 PATENTED JAN 10 1871
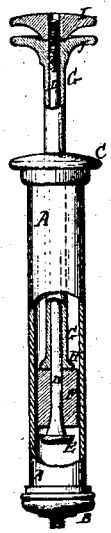
Witnesses:
Inventor:
A. H. Smith
per
Attorneys.

United States Patent Office.

ANDREW H. SMITH, OF NEW YORK, N. Y.

Letters Patent No. 110,874, dated January 10, 1871.

IMPROVEMENT IN PISTONS.

The Schedule referred to in these Letters Patent and making part of the same.

*To all whom it may concern:*

Be it known that I, ANDREW H. SMITH, M. D., of the city of New York, in the county and State of New York, have invented a new and useful Improvement in Pistons; and I do hereby declare that the following is a full, clear, and exact description thereof, which will enable others skilled in the art to make and use the same, reference being had to the accompanying drawing forming part of this specification.

The figure is a side view of a syringe to which my improvement has been attached, parts being broken away to show the construction.

My invention has for its object to improve the construction of pistons in such a way that the packing can be tightened and loosened, as may be desired, without removing it from the barrel or cylinder, or disturbing its connections, and which shall at the same time be simple in construction, effective in operation, and easily operated; and It consists in the construction and combination of various parts, as hereinafter more fully described.

A represents the barrel; B, the nozzle; and C, the cap of a syringe; about the construction of which parts there is nothing new.

D is the piston-rod, to the lower end of which is attached, or upon it is formed, a plate or flange, E.

F is the packing which is placed upon the inner part of the rod D, with its lower end resting against the plate or flange E.

If desired, the lower or inner end of the rod D, upon which the packing F is placed, may be made conical, as shown in the figure, so that it may act as a wedge to expand the packing F when it may be drawn farther into the packing, or when the said packing may be pushed down upon it.

G is a tube or sleeve, placed upon the rod D and having a ring, plate, or flange, H, attached to or formed upon its lower or inner end to rest against the outer end of the packing F.

I is a nut, placed upon a screw-thread cut in the rod D at the outer end of the tubular rod G, to press against the outer end of the said tubular rod D, so that by turning the said nut I forward the plates E and H will be forced toward each other, compressing the packing F longitudinally and causing it to expand laterally, and thus fit more closely into the barrel or cylinder A.

As the nut I is turned back the plates E and H will be forced apart, allowing the packing to contract laterally and expand longitudinally, so as to fit the barrel or cylinder more loosely.

J is a knob, which may be formed upon or attached to the outer end of the tube G or rod D for convenience in working the piston. Or the said piston may be worked by any other desired means.

The packing F may be made of rubber or any other suitable yielding material.

Having thus described my invention,

I claim as new and desire to secure by Letters Patent—

The combination of the rod D, flange or plate E, tubular rod or sleeve G, ring, plate, or flange H, and nut I, with each other, to adapt them to expand and contract the piston packing, substantially as herein shown and described, and for the purposes set forth.

The above specification of my invention signed by me this 31st day of October, 1870.

ANDREW H. SMITH, M. D.

Witnesses:
T. B. MOSHER.
JAMES T. GRAHAM.